(12) United States Patent
Jackson (10) Patent No.: US 9,383,020 B2
(45) Date of Patent: Jul. 5, 2016

(54) HIGH TEMPERATURE SEALS FOR USE IN ROTARY VALVES

(71) Applicant: Fisher Controls International LLC, Marshalltown, IA (US)

(72) Inventor: Trenton Frank Jackson, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 221 days.

(21) Appl. No.: 13/972,597

(22) Filed: Aug. 21, 2013

(65) Prior Publication Data

US 2015/0053880 A1 Feb. 26, 2015

(51) Int. Cl.
*F16K 1/226* (2006.01)
*F16J 15/06* (2006.01)

(52) U.S. Cl.
CPC ............. *F16K 1/2263* (2013.01); *F16J 15/065* (2013.01); *F16K 1/2266* (2013.01)

(58) Field of Classification Search
CPC ...... F16K 1/2263; F16K 1/2266; F16J 15/065
USPC ........................... 251/306, 314, 316–317, 363
See application file for complete search history.

(56) References Cited

U.S. PATENT DOCUMENTS

| | | | |
|---|---|---|---|
| 3,986,699 A * | 10/1976 | Wucik et al. | 251/173 |
| 4,113,268 A | 9/1978 | Simmons et al. | |
| 4,272,054 A | 6/1981 | Zinnai | |
| 4,398,695 A | 8/1983 | Torche | |
| 4,505,290 A | 3/1985 | Scobie | |
| 4,513,765 A * | 4/1985 | Rishovd et al. | 137/72 |
| 4,671,308 A * | 6/1987 | Williams | F16K 5/0626 137/72 |
| 5,082,246 A * | 1/1992 | Stanley et al. | 251/315.14 |
| 6,019,679 A * | 2/2000 | Lloyd | 454/369 |
| 2003/0062500 A1 | 4/2003 | Eggleston et al. | |
| 2006/0214129 A1 | 9/2006 | Eggleston et al. | |
| 2008/0035874 A1 | 2/2008 | Eggleston et al. | |
| 2008/0272324 A1 | 11/2008 | Eggleston et al. | |

FOREIGN PATENT DOCUMENTS

FR 2685748 7/1993

OTHER PUBLICATIONS

International Search Report and Written Opinion, issued by the International Searching Authority in connection with corresponding International patent application No. PCT/US2014/051989, mailed on Nov. 5, 2014, 8 pages.

International Preliminary Report on Patentability, issued by the International Searching Authority in connection with corresponding International patent application No. PCT/US2014/051989, mailed on Feb. 23, 2016, 6 pages.

* cited by examiner

*Primary Examiner* — Marina Tietjen
(74) *Attorney, Agent, or Firm* — Hanley, Flight & Zimmerman, LLC (57) ABSTRACT

High temperature seals for use in rotary valves are described herein. An example seal for use with a rotary valve includes a primary seal to engage a flow control member when the primary seal is in a first condition and a secondary seal at least partially disposed within the primary seal. The primary seal is to prevent the secondary seal from engaging the flow control member when the primary seal is in the first condition and the secondary seal is to engage the flow control member when the primary seal is in a second condition.

24 Claims, 7 Drawing Sheets

HIGH TEMPERATURE SEALS FOR USE IN ROTARY VALVES

FIELD OF THE DISCLOSURE

The present disclosure relates generally to seals and, more specifically, to high temperature seals for use in rotary valves.

BACKGROUND

Control valves (e.g., sliding stem valves, rotary valves, axial flow valves, globe valves, etc.) are commonly used in industrial processes, such as oil and gas pipeline distribution systems and chemical processing plants, to control the flow of process fluids. In some industrial processes, rotary valves such as, for example, butterfly valves are used to control the flow of process fluids. Butterfly valves are favored in certain applications because they are inexpensive to manufacture, relatively lightweight and provide quick and tight shut off.

Butterfly valves include a circular disk disposed within a valve body to regulate the flow of fluid through the valve. A shaft, which passes through a bore in the valve body, is coupled to the disk to rotate the disk within the valve body. A seal (e.g., a hard metal seal or a soft seal) is coupled or clamped to a surface of the valve body via a seal retainer. In a closed position, a sealing edge on the disk engages the seal to prevent the flow of fluid through the valve body.

Different types of seals are used for different applications. Typically, industrial process conditions, such as pressure, temperature, and the type of process fluids dictate the type of valve components needed, including the types of butterfly valve seals that may be used. It is generally known that relatively soft seals provide better sealing than harder seals because soft seals better conform to uneven sealing surfaces than relatively stiff (e.g., less compliant) seals. However, relatively soft seals generally have a lower operating temperature rating than hard seals because the softer materials tend to degrade or deteriorate (e.g., melt) in high temperature applications.

To be used in certain applications, the seals for butterfly valves may be required to pass specific tests and/or be certified under certain standards. For example, to be used in some applications, a seal for a butterfly valve may have to pass the American Petroleum Institute (API) 607 "Fire Test for Soft-Seated Quarter Turn Valves." This standard covers the requirements for testing and evaluating the performance of straightway, soft-seated quarter-turn valves when the valves are exposed to fire conditions. Specifically, this test burns the valve at around 1800° Fahrenheit (F.) and then requires the valve to achieve shutoff once the valve cools. The API 607 test ensures that if an industrial plant or an area in an industrial plant catches fire, the valve can be properly shutoff to prevent the flow of process fluid through the piping distribution system. Therefore, this test requires a seal to provide a proper seal after being exposed to high temperatures. As mentioned above, relatively stiff or hard seals, such as metal seals, are often used in such an application because metal seals generally have rated operating temperatures that enable the seal to withstand high temperatures such as those involved in the above-noted testing. However, with such relatively stiff or hard seals, it may be difficult to achieve a desired tight shutoff of the valve, such as that achieved with a relatively soft seal.

SUMMARY

In one example, a seal for use with a rotary valve described herein includes a primary seal to engage a flow control member when the primary seal is in a first condition and a secondary seal at least partially disposed within the primary seal. In the example, the primary seal is to prevent the secondary seal from engaging the flow control member when the primary seal is in the first condition and the secondary seal is to engage the flow control member when the primary seal is in a second condition.

In another example, a seal for use with a rotary valve described herein includes a first seal to surround a flow control aperture of the valve and to engage a flow control member and a second seal disposed within the first seal and having a shape complementary to the first seal. In such an example, the second seal is to be harder than the first seal and to engage the flow control member when the first seal is in a degraded condition.

In yet another example, a seal for use with a rotary valve described herein includes means for providing a primary seal and means for providing a secondary seal. The means for providing the primary seal is to seat against a flow control member and the means for providing the secondary seal is not to seat against the flow control member when the means for providing the primary seal is in a first condition. Also, the means for providing the secondary seal is to seat against the flow control member when the means for providing the primary seal is in a second condition different than the first condition.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

In general, the example high temperature seals disclosed herein provide the sealing benefits of a soft seal and are also operable after the occurrence of a fire or other exposure to high temperature to ensure proper sealing and shutoff. More specifically, the example seals disclosed herein provide sealing with a relatively soft seal when the soft seal is in a non-degraded state and effective sealing with a hard seal when the soft seal is in a degraded state such as, for example, after a fire or other high temperature event has occurred. Additionally, the example high temperatures seals disclosed herein are more easily manufactured and/or assembled than other known high temperature seals and, thus, have reduced manufacturing and maintenance costs.

Rotary valves (e.g., butterfly valves) include a disk that is rotated within a valve body to open and close a passageway been an inlet and an outlet of the valve. A seal (e.g., a metal seal or a soft elastomer seal) is coupled to the valve body around the passageway and a sealing edge of the disk engages the seal in a closed position to prevent the flow of fluid through the passageway. Different types of seals are used for different applications. To be used in some applications, these seals may be required to pass certain tests and/or receive required certifications.

For example, to be used in some applications, a seal for a butterfly valve may have to pass the American Petroleum Institute (API) 607 "Fire Test for Soft-Seated Quarter Turn Valves." This standard covers the requirements for testing and evaluating the performance of straightway, soft-seated quarter-turn valves when the valves are exposed to fire conditions. Specifically, this test burns the valve at around 1800° F. and then requires good shutoff once the valve cools. Therefore, this test requires the seal to be able to provide proper sealing after being exposed to high temperatures for a period of time. Other standards and certifications include the National Association of Corrosion Engineers (NACE) standards.

Some known fire-safe seals use a tetrafluoroethylene (TFE) seal clamped in a metal cartridge, which is then welded to a metal carrier. The TFE seal engages the sealing edge of the valve disk. During a fire or other high temperature event, the TFE seal deteriorates and the metal cartridge then engages the disk to seal the valve. However, these known fire-safe seals are often difficult and expensive to manufacture because of their shape and structure. Specifically, the metal cartridges of these known high temperature seals include many intricate corners and edges for clamping the TFE seal and are often manufactured using a lengthy and expensive precision cutting process.

The example high temperature seals described herein provide effective sealing in low temperature conditions, provide effective sealing (e.g., shutoff) in and after exposure to high temperature conditions or after excessive cycling, have increased life span and have significantly reduced manufacturing and maintenance costs. In general, the example high temperature seals described herein include a first seal (e.g., a soft seal) that operates to seal the valve while in a first condition (e.g., a non-degraded state, before a fire, under normal operating conditions) and a second seal (e.g., a metal seal), at least partially disposed within the first seal, that operates to seal the valve while in a second condition (e.g., after the first seal has been degraded, after a fire, etc.). In some examples, the second seal includes a bent or angled section to capture (e.g., trap, retain) an amount of the first seal between the second seal and a sealing edge of a disk.

In particular, an example high temperature seal describe herein includes a first seal made of a relatively soft material and a second seal made of a material having a higher melting temperature than the first seal and disposed within the first seal. The relatively soft seal provides a more compliant sealing interface against a sealing edge of a disk than a hard seal and, thus, provides better sealing (e.g., a tighter shutoff) during normal operating conditions. Additionally, in the event of a fire or other high temperature event that degrades or otherwise compromises the soft seal (e.g., because of excessive wear), the example high temperature seal utilizes the hard seal to seal against the disk, because the hard seal has a higher operating and/or melting temperature than the soft seal.

Also, the example high temperature seals described herein are more easily manufactured than other known high temperature seals. Specifically, the costs to manufacture the example high temperature seals and the time required to assemble the example seals is greatly reduced. The hard seal, which may be, for example, metal, may be bent or formed into shape. Subsequently, the soft seal, which may be a relatively soft material (e.g., PTFE), may be molded (e.g., injected, poured, etc.) onto the surface of the hard seal. In other examples, the hard seal may be inserted into the relatively soft seal or coupled to the relatively soft seal.

In the first condition, such as when the valve is operating in a temperature below a threshold temperature, the soft seal engages the valve disk to provide more effective sealing to prevent the flow of process fluid. In some examples, the threshold temperature is defined by the highest operating temperature of the soft seal. If the seal is heated above the threshold temperature and the soft seal is degraded or deteriorated because of this increase in temperature, the hard seal is exposed and engages the disk to seal the valve and prevent the flow of process fluids. In this second condition or state, the soft seal may be degraded or deteriorated because of the high temperature but the hard seal provides a sealing engagement with the disk to prevent the flow of process fluid and ensure proper shutoff.

Figure 1A:
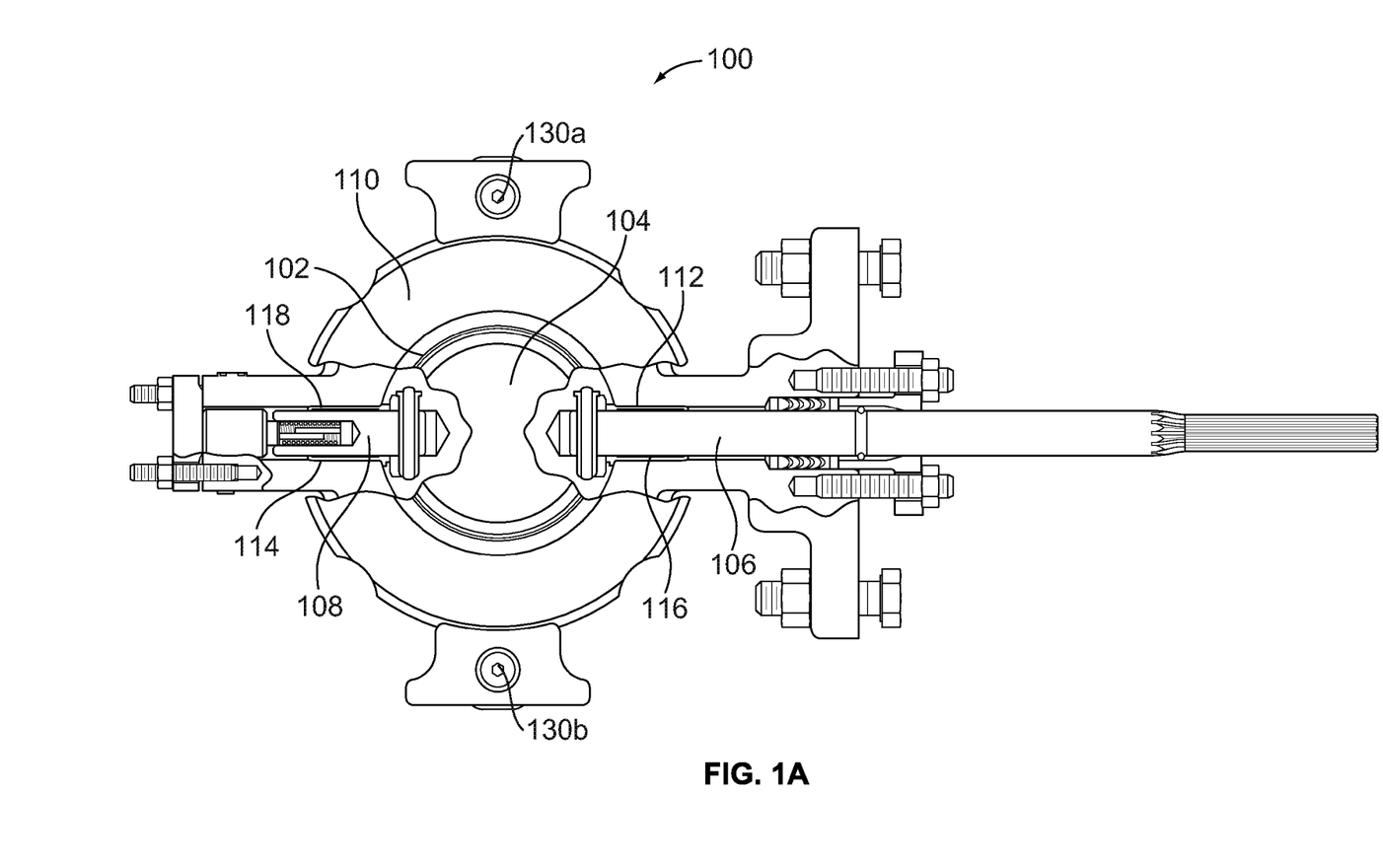
FIG. 1A illustrates a partially sectioned front view of an example butterfly valve.

Turning now to the figures, FIG. 1A shows a partially sectioned front view of an example butterfly valve 100. In this example, the butterfly valve 100 is equipped with an example high temperature seal 102 (e.g., a seal ring). The butterfly valve 100 also includes a disk 104 and shafts 106, 108. The shafts 106, 108 are attached to a backside of the disk 104 and rotate the disk 104 within a valve body 110 to allow or prevent the flow of fluid through the valve body 110. The shafts 106, 108 are disposed in respective bores 112, 114 in the valve body 110 and rotate via respective bearings 116, 118. The bearings 116, 118 may be any type of bearings known to those skilled in the art to allow the shafts 106, 108 and disk 104 to rotate within the valve body 110.

In an open position, the shafts 106, 108 are rotated such that the disk 104 is parallel to the flow of fluid and, thus, provides substantially unrestricted flow through the valve body 110. In a closed position (e.g., the position shown in FIG. 1A), the shafts 106, 108 are rotated so the disk 104 blocks the passage of the valve body 110 and prevents the flow of fluid through the valve body 110. The butterfly valve 100 shown may, for example, be used to control the flow of process fluids, such as natural gas, oil, water, etc.

Figure 1B:
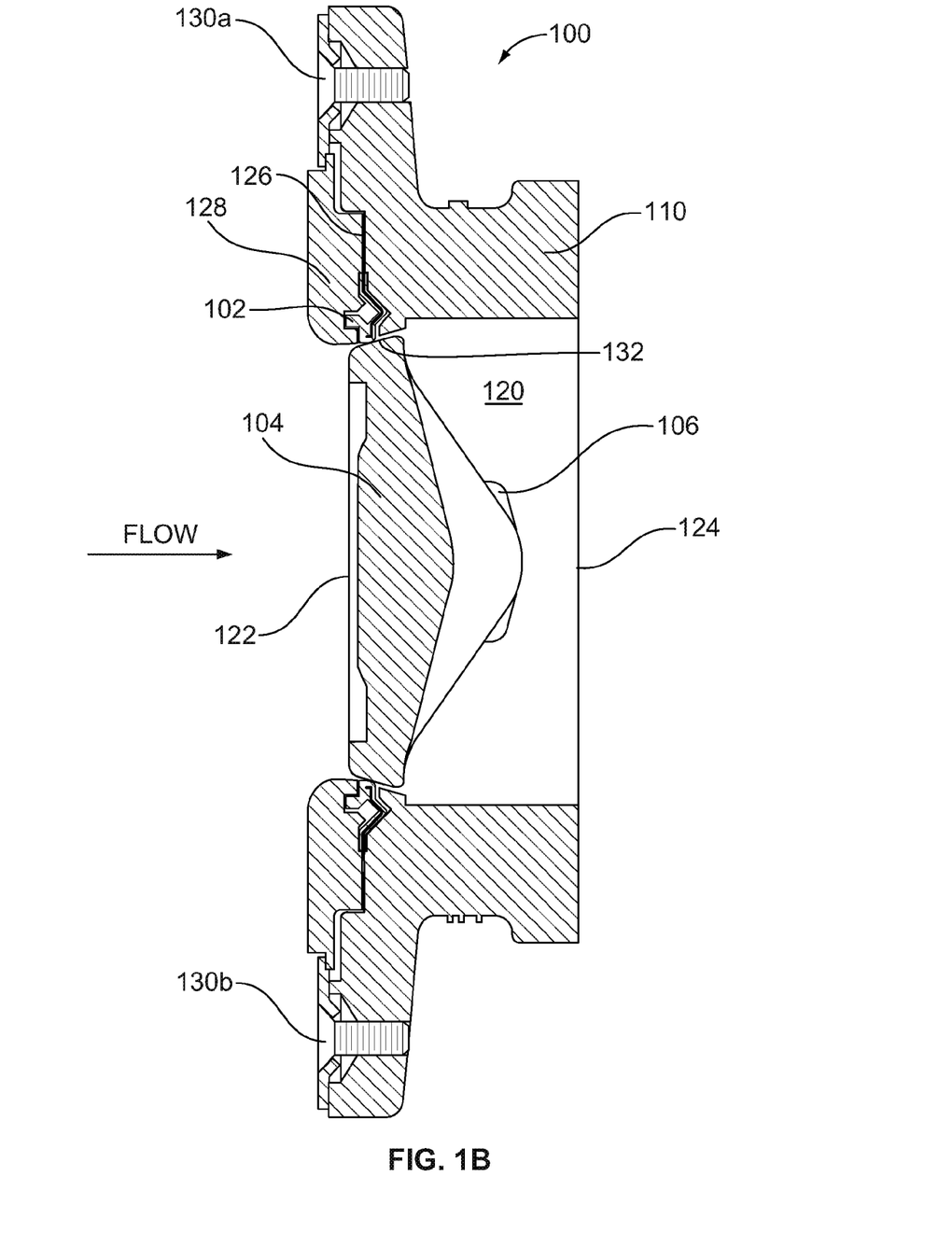
FIG. 1B illustrates a cross-sectional view of a portion of the example butterfly valve of FIG. 1A utilizing an example high temperature seal in accordance with the teachings of this disclosure.

A cross-section of the butterfly valve 100 is shown in FIG. 1B. As shown, the butterfly valve 100 includes the example high temperature seal 102, the disk 104 (e.g., a flow control member), the shaft 106 and the valve body 110. The valve body 110 defines a passageway 120 (e.g., a flow control aperture) between an inlet 122 and an outlet 124 when the butterfly valve 100 is installed in a fluid process system (e.g., a distribution piping system). In the examples described herein, the inlet 122 and the outlet 124 may either be an inlet or an outlet for the flow of process fluids through the valve 100 depending on the direction of fluid flow. In the example shown, the butterfly valve 100 is in a closed position. The butterfly valve 100 may be interposed in a fluid flow path between an upstream supply source and a downstream supply source to control the flow of fluid therebetween. In operation, the disk 104 operates between the closed position (e.g., the position shown in FIG. 1B) to prevent the flow of fluid between the inlet 122 and the outlet 124 and an open position (where the disk 104 is parallel to the flow) to allow the flow of fluid between the inlet 122 and the outlet 124.

In the example shown, the seal 102 is coupled to a surface 126 of the valve body 110 by a seal retainer 128. The seal retainer 128 forms a fluid seal between the disk 104 and the seal 102. The seal retainer 128 is configured to provide simplified maintenance access to the seal 102 for replacement and prevent direct exposure of the seal 102 to the process fluid. The seal retainer 128 is removably coupled or clamped to the surface 126 via mechanical fasteners 130a, 130b (also shown in FIG. 1A), such as, for example, bolts, or any other mechanical fastener(s). When the example valve 100 is fastened (e.g., bolted) to an upstream supply pipe and/or a downstream supply pipe (e.g., via pipe flanges), the fastening force between the pipe(s) and the valve 100 assists in clamping the seal 102 against the surface 126 and forming a fluid seal therebetween. More specifically, the example clamp design s provides a seal between the seal retainer 128, the valve body 110, and the seal 102 by creating intimate contact therebetween to substantially prevent the flow of process fluid between the seal retainer 128 and the valve body 110. In the example shown, the butterfly valve 100 has two mechanical fasteners 130a, 130b. However, in other examples, the butterfly valve 100 may have more or fewer mechanical fasteners. Additionally, gaskets may be provided adjacent to the seal retainer 128, the valve body 110 and the seal 102 to improve seal performance, as disclosed in further detail below.

In the example shown, the example high temperature seal 102 is to engage a sealing edge 132 of the disk 104 to seal the valve 100 and prevent the flow of process fluid through the passage 120. As the valve 100 is closed, the disk 104 is rotated such that the sealing edge 132 of the disk 104 slides against the seal 102 into the closed position (e.g., the position shown in FIG. 1B). In the example shown, the seal 102 is shaped to flex and provide a counter force radially inward (e.g., toward a center of the valve) and against the sealing edge 132 of the disk 104. The seal 102 flexes or expands radially as sealing edge 132 of the disk 104 slides past the seal 102 into the closed position. Once the disk 104 is rotated into the closed position (e.g., the position shown in FIG. 1B), the disk 104 is perpendicular to the flow of fluid and the seal 102 sealingly engages the sealing edge 132 of the disk 104 to prevent the flow of fluid through the valve 100.

In the closed position, the interface (e.g., contact point or surface) between the seal 102 and the sealing edge 132 of the disk prevents the flow of process fluid through the passage 120. The biasing force from the seal 102, and the pressure from the flow of process fluid in a forward flow direction (shown in the direction of the flow arrow), forces the seal 102 in the direction of the fluid flow and, therefore, against the sealing edge 132 of the disk 104 to create a sufficiently tight seal between the seal 102 and the disk 104, which prevents the leakage of process fluid around the disk 104 and through the passage 120 in the valve body 110.

As mentioned above, in operation, the disk 104 rotates between the closed position to prevent the flow of fluid through the passageway 120 between the inlet 114 and the outlet 116 (e.g., in the direction of the flow arrow) and the open position to allow the flow of fluid through the passageway 120 of the valve body 102. To control the flow of process fluid through the valve 100, a control valve instrument may be operatively coupled to the valve 100 and generally provides a pneumatic signal to a valve actuator in response to a control signal from a process controller, which may be part of a distributed control system. The valve actuator may be coupled to the shafts 106, 108, such that the pneumatic signal moves the valve actuator which, in turn, rotates the shafts 106, 108.

Figure 1C:
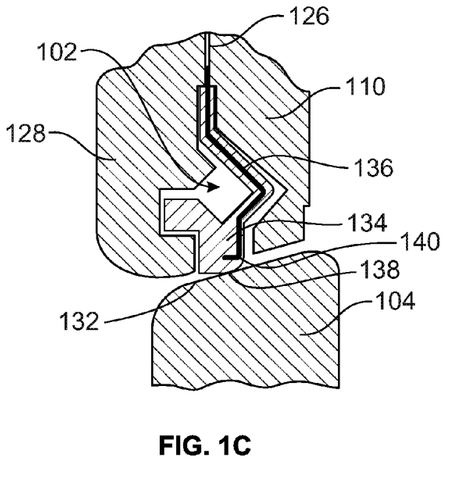
FIG. 1C illustrates an enlarged cross-sectional view of the portion of the example butterfly valve shown in FIG. 1B with the example high temperature seal in a non-degraded condition.
Figure 1D:
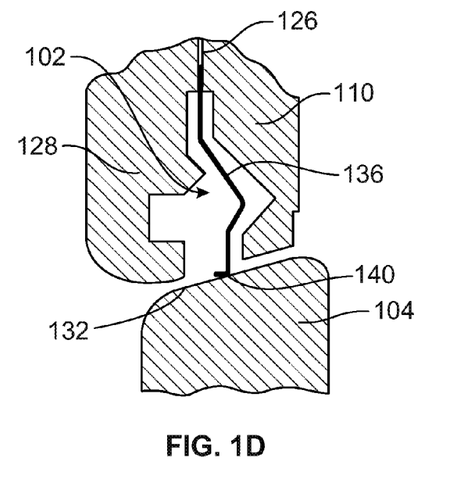
FIG. 1D illustrates an enlarged cross-sectional view of the portion of the example butterfly valve shown in FIG. 1B with the example high temperature seal in a degraded condition.
Figure 1E:
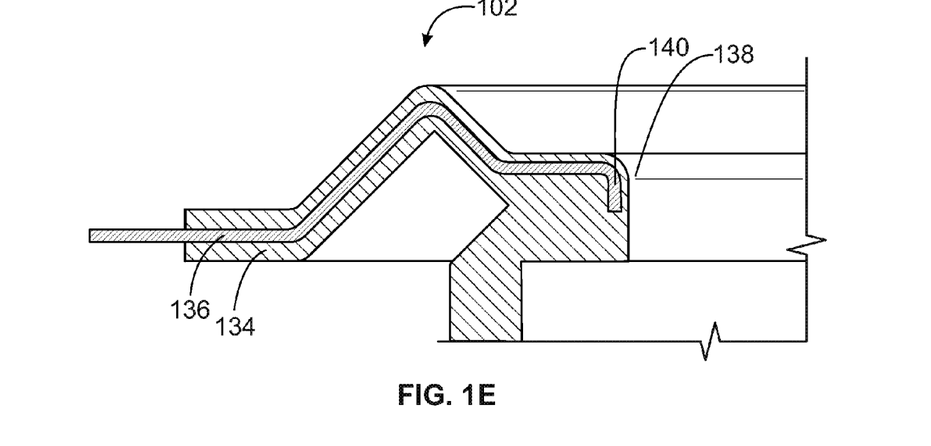
FIG. 1E illustrates a cross-sectioned view of the example high temperature seal shown in FIGS. 1B and 1C, in the non-degraded condition.

FIGS. 1C and 1D show enlarged portions of the cross-section shown in FIG. 1B. Specifically, FIG. 1C illustrates the example seal 102 in a first condition (e.g., non-degraded, non-deteriorated, operable, etc.) and FIG. 1D illustrates the example seal 102 is a second condition (e.g., degraded, deteriorated, etc.). Additionally, FIG. 1E illustrates a cross-sectioned view of the example seal 102 in the first condition.

As shown in FIGS. 1C and 1D, the example seal 102 includes a first seal 134 (e.g., a primary seal) and a second seal 136 (e.g., a secondary seal). The seal 102 is secured within the valve body 110 between the seal retainer 128 and the surface 126 of the valve body 110. Specifically, a portion of the second seal 136 (e.g., an outer radially portion) is clamped between the seal retainer 128 and the valve body 110. In the example shown, the second seal 136 is at least partially disposed within (e.g., encased in, encapsulated in, etc.) the first seal 134 and has a shape that substantially corresponds (e.g., matches, is complementary) to the shape of the first seal 134. In the example shown, the first seal 134 is a soft seal, generally comprised of a softer material, and the second seal 136 is a hard seal, generally comprised of a harder or more rigid material. For example, in some instances, the first seal 134 is made of tetrafluoroethylene (TFE), polytetrafluoroethylene (PTFE), Teflon, ultra-high-molecular-weight polyethylene (UHMWPE), rubber, perfluoroalkoxy resins (PFA) and/or any other suitable soft material used for sealing, and the second seal 136 is made of metal such, as for example, stainless steel (e.g., S13600).

The example seal 102 shown in FIG. 1C is in the first condition, which may be, for example, prior to being exposed to a temperature above an operating and/or degrading temperature of the first seal 134. During operation, the disk 104 is closed and the sealing edge 132 engages a sealing portion 138 (e.g., an inner radially portion) of the first seal 134. In a normal operating state, the first seal (e.g., a soft seal) has not been exposed to temperatures above its operating range and, thus, is not degraded or deteriorated. As mentioned above, during normal operating conditions, below the threshold temperature of the first seal 134 (e.g., 300° F., 500° F., 600-700° F., 1800° F.), the first seal 134 remains intact and is operable to seal against the sealing edge 132 of the disk 104. The first seal 134, being comprised of a relatively softer material, generally provides a more compliant sealing surface and, thus, a tight shutoff under normal operating conditions.

In the example shown, the seal 102, which includes the first seal 134 and the second seal 136, has a bent or angled shape section to provide flexibility and a biasing force radially inward towards the sealing edge 132 of the disk. The first seal 134 and the second seal 136 may provide the same or different amounts of force radially inwards.

FIG. 1D illustrates an example of the seal 102 in the second condition, which may be, for example, a degraded or deteriorated state. As mentioned above, after a fire or high temperature event has occurred, the first seal 134 may be degraded or have a reduced sealing ability. In some instances, this may occur when the valve is heated above the threshold temperature (e.g., 300° F., 500° F., 600-700° F., 1800° F.) of the first seal 134. In such a condition, the second seal 136 seals against the sealing edge 132 of the disk 104 to seal the valve 100 and prevent the flow of process fluid. Specifically, a sealing portion 140 (e.g., a sealing edge, the radially inner portion) of the second seal 136 engages the sealing edge 132 of the disk 104. As mentioned above, the second seal 136 is sized and shaped to flex and provide a biasing force radially inward towards the sealing edge 132 of the disk. Specifically, the second seal 136 is configured to engage the sealing edge 132 of the disk 104 when the first seal 134 deteriorates or is otherwise removed to expose the sealing portion 140 of the second seal 136.

In some examples, the second seal 136 is made of a material having a higher melting temperature and/or operating temperature than the first seal 134 such as, for example, a metal having a melting temperature above 1800° F. In such an example, the example seal 102 meets the requirements of the API 607 test because the second seal 136 provides proper sealing when the first seal 134 is degraded or deteriorated. The seal 102 also provides proper sealing in the event the first seal 134 erodes or deteriorates due to wear. The second seal 136, which is comprised of a relatively hard material, is more resistant to wear and provides a secondary sealing capability if the softer material of the first seal 134 erodes during operation.

The example high temperature seal 102 may be manufactured in a variety of ways. In some examples, the second seal 136 is manufactured first, by stamping or forming the second seal 136 from a piece of metal. After the second seal 136 is formed, the first seal 134 is molded (e.g., injected, poured) onto the second seal 136, thus forming the example high temperature seal 102 shown in FIG. 1E. In other examples, the first seal 134 and the second seal 136 are made independently, and the second seal 136 may be inserted into the first seal 134, which is generally comprised of a softer material. The first seal 134 and the second seal 136 may be coupled to each other via friction (e.g., the interface between the two materials), an adhesive or any other suitable fastening mechanism(s). In some examples, the angled shape of the second seal 136 and the corresponding shape of the first seal 134 prevent the first seal 134 from being removed from the second seal 136.

In the example shown, the second seal 136 is disposed generally within the center of the first seal 134. However, in other examples, the second seal 136 may be offset within the first seal 136 (i.e., the thickness of the first seal 134 on the second seal 136 may be different on opposing sides). Also, as illustrated in FIGS. 1C and 1E, the first seal 134 covers a majority of the length of the second seal 134 (e.g., from the inner radial end to the outer radial end). In other examples, the first seal may be much smaller and, for example, may only cover the inner radial portion of the second seal 136 around the sealing portion 140 of the second seal 136.

Figure 2:
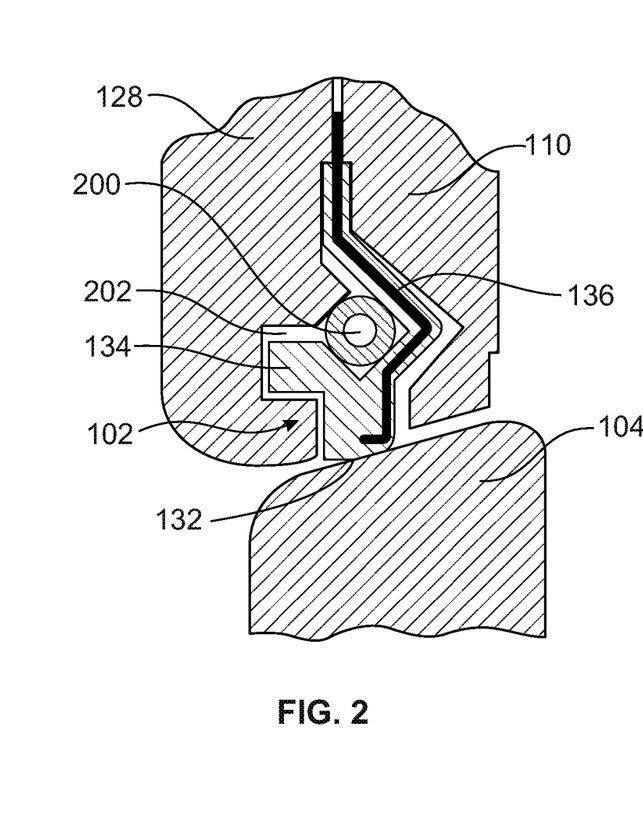
FIG. 2 illustrates an enlarged cross-sectional view of the example butterfly valve and example high temperature seal of FIG. 1C with an example spring.

In some examples, as shown in FIG. 2, a spring 200 may be included to bias the example high temperature seal 102 radially inward (e.g., toward a center of the valve body 110) towards the sealing edge 132 of the disk 104. As shown, the spring 200 is disposed within a cavity 202 formed between the first seal 134 and the seal retainer 128. As the valve 100 (shown in FIGS. 1A and 1B) is closed, the disk 104 is rotated such that the sealing edge 132 slides against first seal 134 into the closed position. The spring 200 allows the seal 102 to compress as the disk 104 is rotated into position and biases the seal 102 radially inward to create a sufficiently tight seal between the seal 102 (e.g., the first seal 134) and the sealing edge 132 of the disk 104. In the event of a fire or other high temperature event that causes the first seal to degrade, the spring 200 may assist in biasing the second seal 136 radially inward towards the sealing edge 132 of the disk 104.

Figure 3:
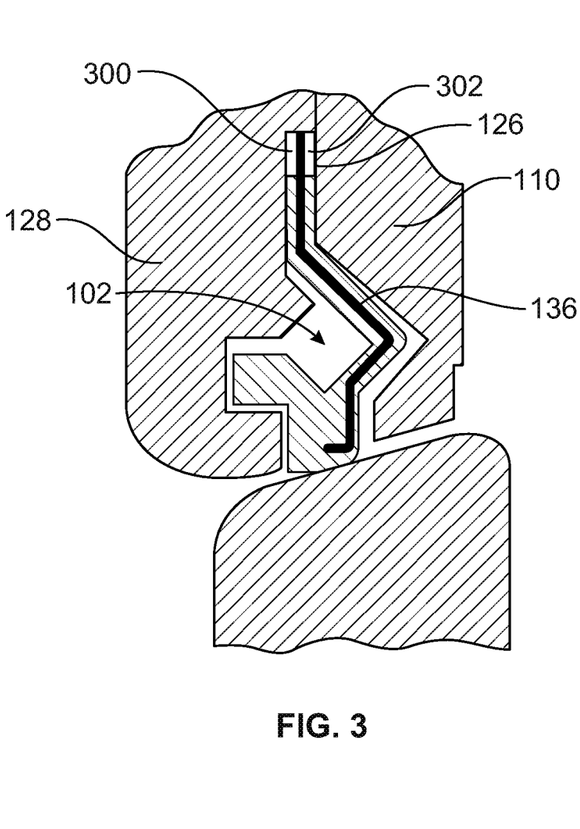
FIG. 3 illustrates an enlarged cross-sectional view of the example butterfly valve and example high temperature seal of FIG. 1C with example gaskets.

As shown in FIG. 3, the example seal 102 may be coupled between the surface 126 of the valve body 110 and the seal retainer 128 via a first gasket 300 and a second gasket 302 (e.g., graphite gaskets). In particular, the first and second gaskets 300, 302 are disposed on either side of the second seal 136 (e.g., the outer radial portion) to facilitate a seal between the valve body 110, the seal retainer 128 and the seal 102. In some examples, the gaskets 300, 302 assist in maintaining a fluid seal in the event of a fire or other high temperature event. The gaskets 300, 302 may have a relatively high operating temperature limit to ensure proper sealing.

Figure 4A:
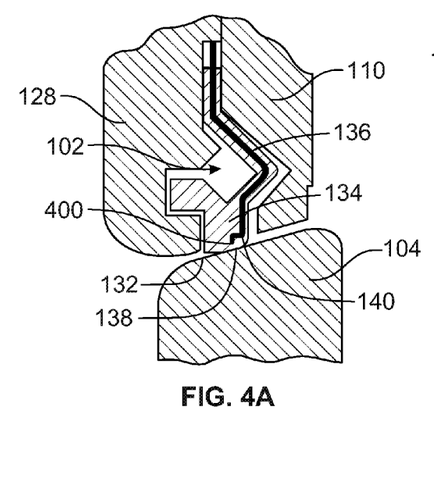
FIG. 4A illustrates an enlarged cross-sectional view of the example butterfly valve and example high temperature seal of FIG. 1C having an example angled section, the example seal being in a non-degraded condition.
Figure 4B:
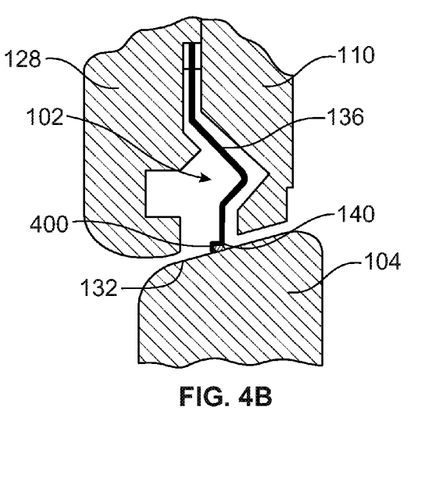
FIG. 4B illustrates the enlarged cross-sectional view of the example butterfly valve of FIG. 4A with the example high temperature seal having an example angled section, the example seal being in a degraded condition.
Figure 4C:
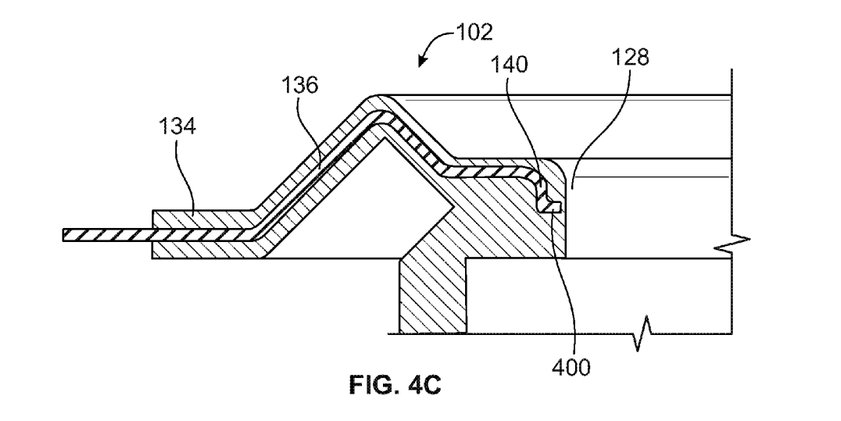
FIG. 4C illustrates a cross-sectioned view of the example high temperature seal of FIG. 4A with the example angled section.

FIGS. 4A-4C show an example of the second seal 136 having a bent or angled section 400 at the sealing portion 140. FIG. 4A illustrates the seal 102 in the first condition (e.g., when the first seal 134 is not degraded) and FIG. 4B illustrates the seal 102 in the second condition (e.g., when the first seal 134 is degraded). FIG. 4C is a cross-sectioned view of the seal 102 illustrating the second seal 136 having the bent section 400. As shown in FIGS. 4A and 4B, the seal 102 is coupled between the seal retainer 128 and the valve body 110. The sealing portion 140 of the second seal 136 includes the angled section 400, which extends toward the sealing edge 132 of the disk 104. In the first condition, shown in FIG. 4A, the sealing portion 138 of the first seal 136 engages the sealing edge 132 of the disk. The first condition may occur when the seal 102 is in a normal operating condition below a threshold temperature, which may be, for example, the maximum operating temperature of the first seal 134.

In the second condition, shown in FIG. 4B, a majority of the first seal 134 has been degraded (e.g., melted away, deteriorated) leaving only the second seal 136 to seal against the disk 104. However, in this example, an amount of the first seal 134 is captured (e.g., trapped, caught, retained, etc.) between the angled section 400, the sealing portion 140 of the second seal 136 and the sealing edge 132 of the disk 104. The profile formed between these surfaces creates a cavity (e.g., a void, a groove, a corner, etc.) where the first seal 134 or a degraded amount thereof may accumulate.

In operation, when a fire or other high temperature event occurs, the first seal 134 degrades (e.g., erodes, melts). As this happens, the sealing portion 140 of second seal 136 extends downward (e.g., through the biasing force created by the shape of the second seal 136) toward the sealing edge 132 of the disk 104. As the sealing portion 140 of the second seal 136 engages the sealing edge 132 of the disk 104, a cavity (e.g., a void, a groove, etc.) is formed and retains an amount of the degrading first seal 134. In the second condition, such as after the seal 102 has cooled down, the amount of the first seal 134 captured by the angled section 400 may harden or solidify back to its original operating state. In such an example, the seal 102 provides improved sealing following a high temperature event because the remaining captured softer material of the first seal 134 provides a soft seal interface between the second seal 136 and the sealing edge 132 of the disk 104.

Figure 5A:
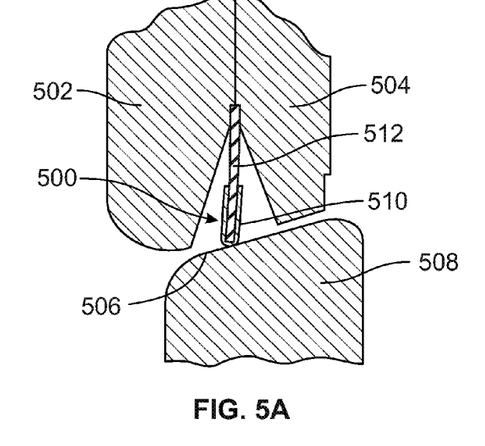
FIG. 5A illustrates an enlarged cross-sectional view of an example butterfly valve having an example high temperature flat seal in a non-degraded condition.
Figure 5B:
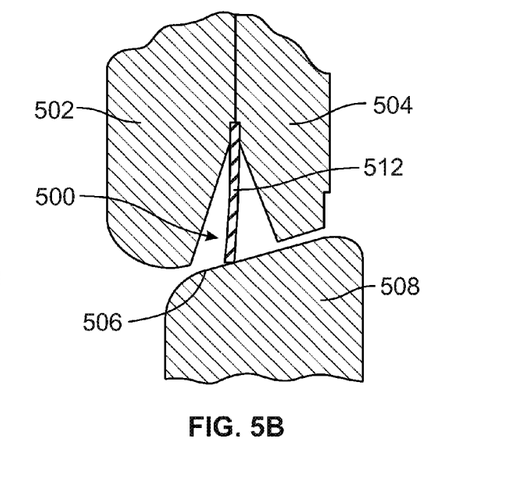
FIG. 5B illustrates an enlarged cross-sectional view of the example butterfly valve of FIG. 5A having the example high temperature flat seal in a degraded condition.
Figure 5C:
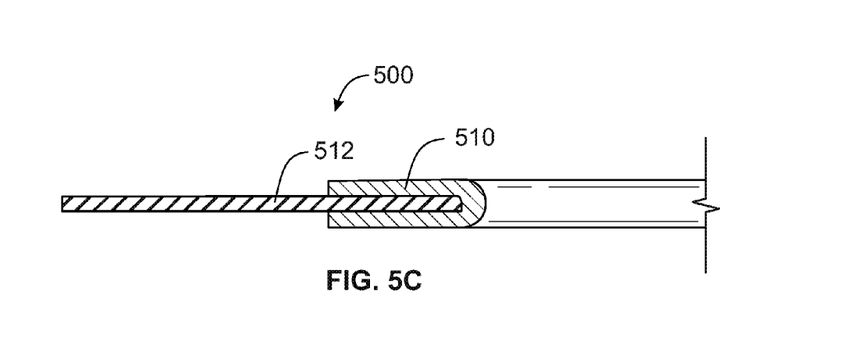
FIG. 5C illustrates a cross-sectional view of the example high temperature flat seal of FIG. 5A.

FIGS. 5A-5C illustrate an example high temperature flat seal 500 for use in rotary valves. FIG. 5A illustrates an example of the seal 500 in a first condition (e.g., a non-degraded or non-deteriorated state) and FIG. 5B illustrates an example of the seal 500 in a second condition (e.g., a degraded or deteriorated state). As shown, similar to the example seal 102 described above, the seal 500 is coupled between a seal retainer 502 and a valve body 504. The seal 500 is to engage a sealing edge 506 of a disk 508. In some examples, the seal 500 is considered a flat seal or a flat gasket seal. As shown in FIGS. 5A and 5C, the seal 500 includes a first seal 510 and a second seal 512. The second seal 512 is disposed at least partially in the first seal 510. In some examples, the first seal 510 is comprised of a relatively soft material (e.g., PTFE, TFE, UHMWPE, PFA) and the second seal 512 is comprised of a relatively hard material (e.g., metal). In the first condition, as shown in FIG. 5A, the first seal 510 is engaged with the sealing edge 506 of the disk 508. In some examples, the seal 500 flexes against the sealing edge 506 of the disk 508 as shown. In the second condition, as shown in FIG. 5B, such as when a fire or other elevated temperature event has occurred, the second seal 512 engages the sealing edge 506 of the disk 508. In some examples, where the first seal 510 is comprised of a relatively soft material having a relatively low melting temperature, the first seal 510 deteriorates during the fire or other high temperature event. As a result, the second seal 512 extends downward (e.g., radially inward) and engages the sealing edge 506 of the disk 508. The second seal 512 is positioned to engage the disk 508 at all times, but when the first seal 510 is in a non-degraded condition, the first seal 510 engages the disk 508.

In some examples, the seal 500 may be manufactured by molding (e.g., injection molding) the first seal 510 onto the second seal 512. In other examples, the first seal 510 may be molded separately and the second seal 512 may be inserted into the first seal 510. The first seal 510 may be coupled to the second seal 512 via friction, an adhesive or any other suitable fastening mechanism(s). The manufacturing costs associated with the example high temperature flat seal 500 are significantly lower than other known high temperature seals.

Figure 6A:
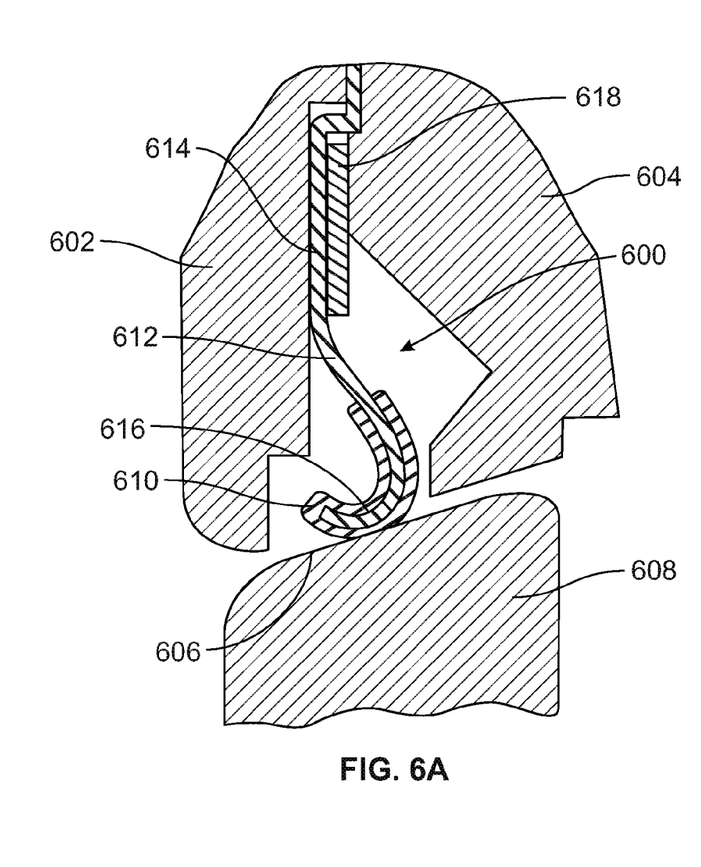
FIG. 6A illustrates an enlarged cross-sectional view of an example butterfly valve having an example high temperature cantilever seal in a non-degraded condition.
Figure 6B:
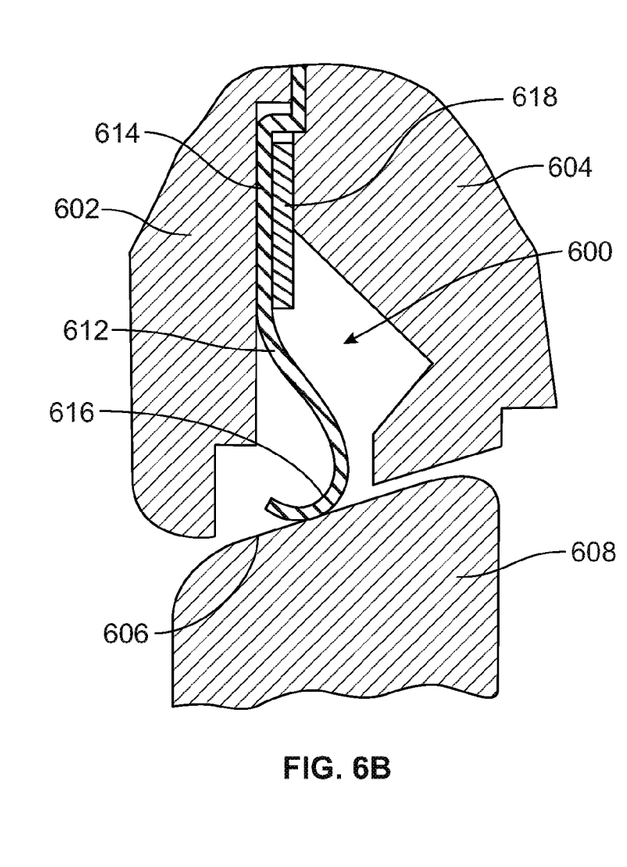
FIG. 6B illustrates an enlarged cross-sectional view of the example butterfly valve of FIG. 6A having the example high temperature cantilever-type seal in a degraded condition.

FIGS. 6A and 6B illustrate an example of an enlarged cross-sectional view of a rotary valve having an example high temperature cantilever seal 600. FIG. 6A illustrates an example of the seal 600 in a first condition (e.g., a non-degraded or non-deteriorated state) and FIG. 6B illustrates an example of the seal in a second condition (e.g., a degraded or deteriorated state). As shown, similar to the example seals 102 and 500 disclosed above, the seal 600 is coupled between a seal retainer 602 and a valve body 604. The seal 600 is to engage a sealing edge 606 of a disk 608. The example seal 600 includes a first seal 610 and a second seal 612, and the second seal 612 is disposed at least partially in the first seal 610. The second seal 612 has a flange portion 614 and a curved sealing portion 616. In the example shown, the flange portion 614 is coupled between a gasket 618, the valve body 604 and the seal retainer 602.

As illustrated, the curved profile of the second seal 612 provides flexibility and, thus, a biasing force against the disk 608 when the seal 600 is engaged with the disk 608. As the disk 608 is rotated into a closed position (e.g., the position shown), the seal 600 flexes as the sealing edge 606 of the disk 608 rotates into the closed position. In some examples, the first seal 610 is comprised of a softer material (e.g., TFE, PTFE, UHMWPE, PFA) and the second seal 612 is comprised of a harder material (e.g., metal) or material having a higher operating temperature than the first seal 610. In the first condition, as shown in FIG. 6A, the first seal 610 is engaged with the sealing edge 606 of the disk 608. In some examples, the seal 600 flexes against the sealing edge 606 of the disk 608 as shown. In the example shown in FIG. 6A, in the first condition, the first seal is non-degraded and engaged with the sealing edge 606 of the seal 608 to prevent the flow of fluid through the valve.

In the second condition, as shown in FIG. 6B, such as when a fire or elevated temperature has occurred, the sealing portion 616 of second seal 612 engages the sealing edge 606 of the disk 608. In some examples, where the first seal 610 is comprised of a softer material having a lower melting temperature, the first seal 610 degrades (e.g., erodes, melts, deteriorates). In such an example, the second seal 612 flexes radially inward and engages the sealing edge 606 of the disk 608 to seal against the disk 608 and prevent the flow of process fluid.

The example high temperatures seals 102, 500 and 600 described above have been illustrated in connection with a butterfly valve. However, the example high temperatures seals 102, 500 and 600, and variations thereof, may be used in other process control valves such as, for example, ball valves or other rotary valves capable of receiving hard or soft seals. Additionally, the example high temperature seals 102, 500 and 600 have been illustrated in use with a butterfly valve having an eccentric or offset disk. However, the example high temperatures seals 102, 500, and 600 disclosed herein may also be used in butterfly valves having concentric or aligned disks.

The example high temperature seals 102, 500 and 600 disclosed herein advantageously provide the benefits of a soft seal interface and proper sealing after a fire or other elevated temperature event. Specifically, the example high temperature seals 102, 500 and 600 include a first seal that provides the benefits of a relatively soft or compliant seal. In addition, in the event the example high temperate seals 102, 500 and 600 are at least partially degraded, the example seals 102, 500 and 600 include a second seal to ensure effective sealing and, thus, proper shutoff of the valve.

Although certain example apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A seal for use with a rotary valve, the seal comprising:
a primary seal to engage a flow control member when the primary seal is in a first condition; and
a secondary seal at least partially disposed within the primary seal, the secondary seal having a sealing portion, wherein the primary seal is disposed between the sealing portion and the flow control member to prevent the secondary seal from engaging the flow control member when the primary seal is in the first condition and the sealing portion of the secondary seal is to engage the flow control member when the primary seal is in a second condition, and wherein the secondary seal is shaped to retain an amount of the primary seal when the primary seal is in the second condition.

2. The seal as defined in claim 1, wherein the second condition is associated with a reduced sealing ability of the primary seal.

3. The seal as defined in claim 1, wherein the second condition occurs after the primary seal is exposed to a temperature greater than a threshold temperature.

4. The seal as defined in claim 1, wherein the secondary seal has a melting temperature greater than about 1800° F.

5. The seal as defined in claim 1, wherein the secondary seal comprises metal.

6. The seal as defined in claim 5, wherein the primary seal comprises at least one of tetrafluoroethylene (TFE), polytetrafluoroethylene (PTFE), ultra-high-molecular-weight polyethylene (UHMWPE) or perfluoroalkoxy resins (PFA).

7. The seal as defined in claim 1, wherein a portion of the secondary seal disposed within the primary seal has a profile that substantially corresponds to the primary seal.

8. The seal as defined in claim 1, wherein the secondary seal is shaped to provide a biasing force against the flow control member.

9. The seal as defined in claim 1, wherein the primary seal covers at least a portion of a first side of the secondary seal and a second side of the secondary seal opposite the first side.

10. The seal as defined in claim 1, wherein the secondary seal extends along a center of the primary seal when the primary seal is in the first condition.

11. The seal as defined in claim 1, wherein the primary seal covers a majority of a length of the secondary seal.

12. A seal for use with a rotary valve, the seal comprising:
a primary seal to engage a flow control member when the primary seal is in a first condition; and
a secondary seal at least partially disposed within the primary seal, the secondary seal having a sealing portion, wherein the primary seal is disposed between the sealing portion and the flow control member to prevent the secondary seal from engaging the flow control member when the primary seal is in the first condition and the sealing portion of the secondary seal is to engage the flow control member when the primary seal is in a second condition, and wherein a portion of the secondary seal not disposed within the primary seal is coupled to a surface of the valve surrounding a flow control aperture.

13. A seal for use with a rotary valve, the seal comprising:
a first seal to surround a flow control aperture of the valve and to engage a flow control member; and
a second seal disposed within the first seal and having a shape complementary to the first seal, the second seal to be harder than the first seal, the first seal to surround an inner radial portion of the second seal, a portion of the first seal disposed between the inner radial portion of the second seal and the flow control member to engage the flow control member when the first seal is in a non-degraded condition, and the inner radial portion of the second seal to engage the flow control member when the first seal is in a degraded condition.

14. The seal as defined in claim 13, wherein the first seal prevents the second seal from engaging the flow control member when the first seal is in a non-degraded condition.

15. The seal as defined in claim 13, wherein the second seal has a melting temperature of greater than about 1800° F.

16. The seal as defined in claim 13, wherein the second seal has a melting temperature higher than the first seal.

17. The seal as defined in claim 13, wherein a portion of the second seal is coupled between a seal retainer and a surface of the valve.

18. The seal as defined in claim 13, wherein the second seal comprises an angled section to retain an amount of the first seal when the first seal is in the degraded condition.

19. A seal for use with a rotary valve, the seal comprising:
means for providing a primary seal; and
means for providing a secondary seal, wherein the means for providing the primary seal is to seat against a flow control member and the means for providing the secondary seal is not to seat against the flow control member when the means for providing the primary seal is in a first condition, and the means for providing the secondary seal is to seat against the flow control member when the means for providing the primary seal is in a second condition different than the first condition, and wherein the means for providing the primary seal surrounds an inner radial portion of the means for providing the secondary seal such that the means for providing the primary seal is disposed between the means for providing the secondary seal and the flow control member when the means for providing the primary seal is in the first condition.

20. The seal as defined in claim 19, wherein the first condition is a non-degraded condition and the second condition is a degraded condition.

21. The seal as defined in claim 19, wherein a portion of the means for providing the secondary seal is encapsulated by a portion of the means for providing the primary seal.

22. The seal as defined in claim 19, wherein the means for providing the secondary seal has a melting temperature greater than the means for providing the primary seal.

23. A seal for use with a rotary valve, the seal comprising:
a primary seal to engage a flow control member when the primary seal is in a first condition; and
a secondary seal at least partially disposed within the primary seal, the secondary seal having a sealing portion, wherein the primary seal is disposed between the sealing portion and the flow control member to prevent the secondary seal from engaging the flow control member when the primary seal is in the first condition and the sealing portion of the secondary seal is to engage the flow control member when the primary seal is in a second condition, and wherein the sealing portion is curved to form a cavity facing the flow control member, the cavity to retain an amount of the primary seal between the sealing portion and flow control member when the primary seal is in the second condition.

24. A seal for use with a rotary valve, the seal comprising:
a primary seal to engage a flow control member when the primary seal is in a first condition, the primary seal including a first radial outer section, a first middle curved section and a first radial inner section; and
a secondary seal at least partially disposed within the primary seal, the secondary seal having a sealing portion, wherein the primary seal is disposed between the sealing portion and the flow control member to prevent the secondary seal from engaging the flow control member when the primary seal is in the first condition and the sealing portion of the secondary seal is to engage the flow control member when the primary seal is in a second condition, a portion of the secondary seal disposed within the primary seal having a second radial outer section, a second middle curved section and a second inner radial section corresponding to the respective first radial outer section, the first middle curved section and the first radial inner section.

* * * * *